No. 808,358. PATENTED DEC. 26, 1905.
J. A. FRANK.
GLASS FURNACE.
APPLICATION FILED MAR. 6, 1905.

2 SHEETS—SHEET 1.

WITNESSES:
Herbert Bradley.
Fred Kirchner.

INVENTOR
James A. Frank,
by Christy & Christy, Att'ys.

UNITED STATES PATENT OFFICE.

JAMES A. FRANK, OF WELLSBURG, WEST VIRGINIA.

GLASS-FURNACE.

No. 808,358.     Specification of Letters Patent.     Patented Dec. 26, 1905.

Application filed March 6, 1905. Serial No. 248,571.

*To all whom it may concern:*

Be it known that I, JAMES A. FRANK, a citizen of the United States, residing at Wellsburg, in the county of Brooke and State of West Virginia, have invented or discovered certain new and useful Improvements in Glass-Furnaces, of which improvements the following is a specification.

The invention described herein relates to certain improvements in tank-furnaces. It is customary to construct this class or type of furnaces with a melting and refining chamber from which the glass flows into the working chamber, from which the glass is taken to be shaped by pressing, blowing, &c. As heretofore constructed each of these chambers has been provided with independent means for heating and independent connections to the stack. Hence in case of a shut-down, as over Sunday or a holiday, the furnaces required constant attention, as the means employed for heating operated on the regenerative principle, requiring a frequent reversal of the furnace. It is also characteristic of this type of furnace now in use that the sole connection between the two chambers is the passage through which the glass flows from one chamber to the other. It has been found in practice that when the operation of a plant having such a furnace is stopped for any considerable time, as one or two days, and the flow of glass from one chamber to the other is arrested this connecting-passage is liable to become clogged, as during such stoppage the glass is allowed to cool down below a good working temperature.

The invention described herein has for its object a construction of furnace in which both the melting and working chambers are provided with independent means for heating, but have a common connection to the stack, the heat and products of combustion from the working chamber passing through the melting-chamber.

The invention is hereinafter more fully described and claimed.

Figure 1:
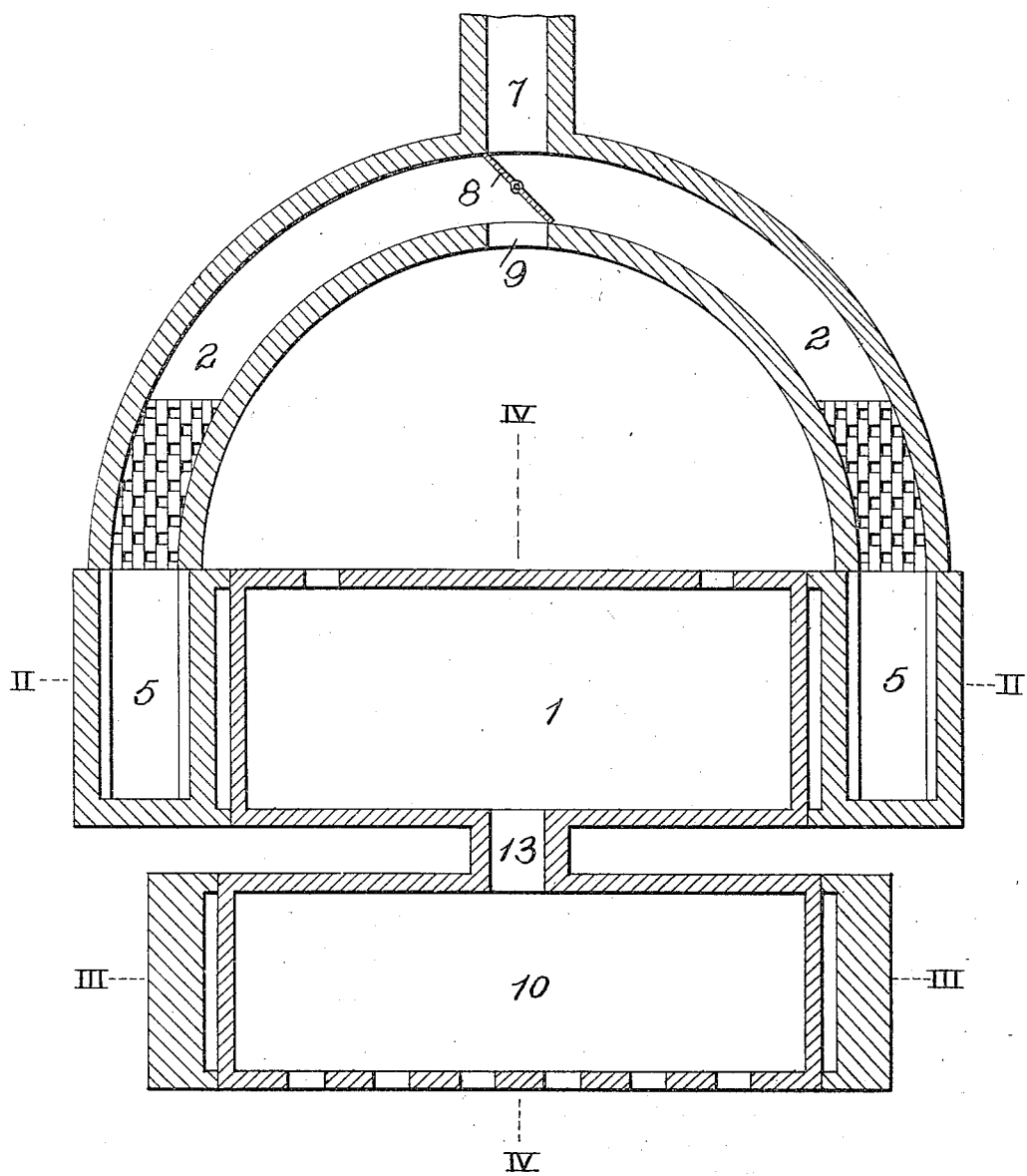
Figure 2:
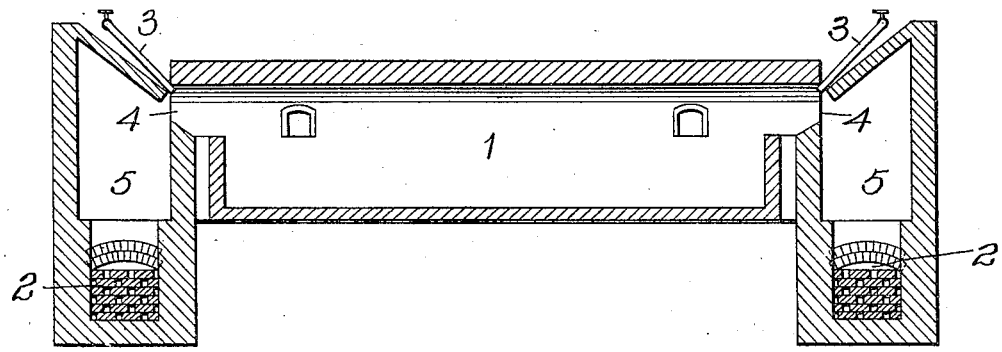
Figure 3:
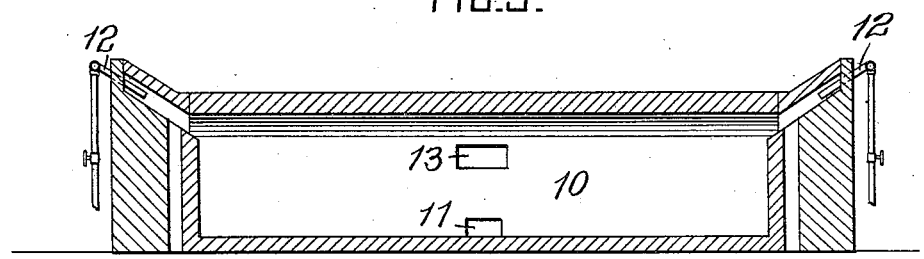
Figure 4:
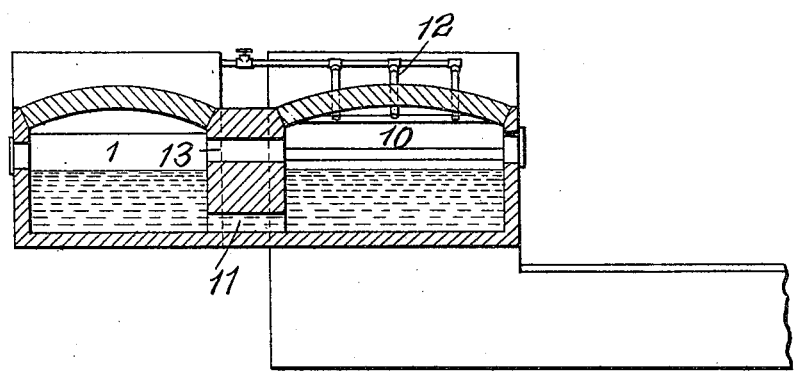

In the accompanying drawings, forming a part of this specification, Figure 1 is a sectional plan view of my improved furnace. Figs. 2 and 3 are sectional elevations on planes indicated, respectively, by the lines II II and III III, Fig. 1; and Fig. 4 is a transverse section on the plane indicated by the line IV IV, Fig. 1.

In the practice of my invention the melting and refining chamber 1, which may be of any desired shape or construction, is heated regeneratively, and to this end opposite portions of the chamber 1 are connected by flues to regenerating-chambers, which, if desired, may be formed in the passages 2 leading to the stack. Producer or other gas may be used to heat the chamber 1, and when using the producer-gas provision should be made in the manner well known in the art for heating both the gas and air. In the construction shown provision is made for using a gas which does not need preheating and is therefore introduced through the pipes 3, entering the furnace above the air-ports 4. The ports 4 connect with the flues 5, extending up vertically from the horizontal flues 2, which converge to the stack-flue 7 and have checkerwork arranged therein for a portion of their length. A butterfly-valve 8 is arranged at the junction of the flues 6 with the stack-flue, so that by the adjustment of the valve either flue can be connected with the stack and the other flue with the air-inlet port 9.

The working chamber 10 is arranged in convenient relation to the melting-chamber, so that molten glass will flow from the melting and refining chamber to the working chamber through a port or passage 11. The glass is maintained at the desired working temperature by means of gas entering the chamber through the oppositely-arranged burners 12, which are preferably fixed at an angle to cause the heat to impinge on the glass in the working chamber. The products of combustion escape from the working chamber to the melting-chamber through the passage or port 13. The ports or passages 11 and 13 are arranged in such relation to each other that glass in the passage 11 will be maintained in a molten fluid condition, even if there is no flow of glass from one chamber to the other, by the heat and products of combustion passing through the port or passage 13.

In the construction shown two sets of gas-burners oppositely-arranged are employed for heating the working chamber. Hence the outlet-passage 13 is so arranged that the heat and products of combustion will act with approximate equality on all portions of the surface of the glass. This is a characteristic feature of my improvement that in all cases it is preferred to arrange the outlet-passage and the source of heat in the working chamber in such relation to each other that the heat and products of combustion flowing from one to the other will maintain all parts of the glass in said chamber at a uniform or approximately uniform temperature, and it is a further characteristic of the invention that the passages 11 and 13 for the glass and the products of combustion should be in such relation to each other that glass will not solidify in one passage so long as sufficient heat is being maintained in the working chamber to keep the glass therein in a plastic condition.

In case of a shut-down for one or more days the gas and air are cut off from the melting-chamber, and the reversing-valve is so arranged that both passages or flues 2 are in communication with the stack-flue. Gas is allowed to burn in the working chamber, and the heat and products of combustion flowing though the passage will divide and flow toward each end of the melting-chamber and through both lines of flues to the stack. By this means both bodies of glass can be maintained in a working condition and no time need be lost on resumption of work in heating the furnace and glass contained therein.

I claim herein as my invention—

1. A glass-furnace having in combination a melting and refining chamber, a working chamber, a stack-flue connected to one chamber, a port or passage for conducting products of combustion from one chamber to the other and a port or passage for conducting glass from one chamber to the other, said ports or passages being so located that one will be heated by the other.

2. A glass-furnace having in combination a melting and refining chamber connected to a stack, oppositely-arranged means for heating said chamber, a working chamber, oppositely-disposed means for heating said chamber, a flue for products of combustion connecting said chambers and so arranged with reference to the heating means of the working chamber and the stack connection of the melting-chamber as to insure an even distribution of heat in both chambers.

3. A glass-furnace having in combination a melting and refining chamber having its ends connected to a stack, means for heating said chamber arranged at the ends thereof, a working chamber, means located at its ends for heating said chamber, a flue for products of combustion extending from a point approximately midway of the length of the working chamber to a point approximately midway between the outlets of the melting-chamber, and a port or passage for the flow of glass from the melting to the working chamber.

In testimony whereof I have hereunto set my hand.

JAMES A. FRANK.

Witnesses:
ROBERT NICHOLLS,
JOSEPH LEVYKUS.